United States Patent
Kollati et al.

(10) Patent No.: US 11,035,257 B2
(45) Date of Patent: Jun. 15, 2021

(54) DRIVEN CAVITY PARTICLE SEPARATOR

(71) Applicant: HONEYWELL INTERNATIONAL INC., Morris Plains, NJ (US)

(72) Inventors: Vighneswara Rao Kollati, Andhra Pradesh (IN); Yogendra Yogi Sheoran, Scottsdale, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 611 days.

(21) Appl. No.: 15/877,702

(22) Filed: Jan. 23, 2018

(65) Prior Publication Data

US 2019/0226362 A1   Jul. 25, 2019

(51) Int. Cl.
*B01D 45/08* (2006.01)
*F01D 25/32* (2006.01)
*F02C 7/052* (2006.01)

(52) U.S. Cl.
CPC ............. *F01D 25/32* (2013.01); *B01D 45/08* (2013.01); *F02C 7/052* (2013.01); *B01D 2279/60* (2013.01); *F05D 2220/323* (2013.01); *F05D 2220/50* (2013.01); *F05D 2240/00* (2013.01); *F05D 2260/00* (2013.01)

(58) Field of Classification Search
CPC ......... F01D 25/32; F02C 7/052; B01D 45/04; B01D 45/08; B01D 2279/60; F05D 2220/50; F05D 2220/323; F05D 2260/00; F05D 2240/00; Y02T 50/60
See application file for complete search history.

(56) References Cited

U.S. PATENT DOCUMENTS

| | | | |
|---|---|---|---|
| 3,517,486 A | 6/1970 | Golden | |
| 3,673,771 A | 7/1972 | Dickey | |
| 4,198,219 A * | 4/1980 | Krisko | B01D 45/08 55/430 |
| 4,704,145 A | 11/1987 | Norris et al. | |
| 4,802,901 A | 2/1989 | Wurz et al. | |
| 5,883,350 A | 3/1999 | Eerkens et al. | |
| 8,092,145 B2 | 1/2012 | Martel et al. | |
| 2007/0235373 A1 | 10/2007 | Strangman et al. | |
| 2010/0326026 A1 | 12/2010 | Bratton | |
| 2016/0045847 A1 | 2/2016 | Kuennen | |

FOREIGN PATENT DOCUMENTS

| | | |
|---|---|---|
| BE | 867741 A | 10/1978 |
| CN | 106268050 A | 1/2017 |
| EP | 3150826 A1 | 4/2017 |
| EP | 3513859 A1 | 7/2019 |
| GB | 288992 A | 11/1928 |
| GB | 421888 A | 12/1934 |
| GB | 1449186 A | 9/1976 |
| JP | S61250324 A | 11/1986 |

* cited by examiner

*Primary Examiner* — Lucas A Stelling
*Assistant Examiner* — Hafiz Muhammad Aamir
(74) *Attorney, Agent, or Firm* — Lorenz & Kopf, LLP

(57) ABSTRACT

A particle separator includes a housing defining an inlet and an outlet. A flow stream is directed from the inlet to the outlet. A number of dividers are disposed in the housing and separate flow channels from each other. The flow channels extend from the inlet to the outlet. The dividers each have a profile so that the flow channels follow the profile. The dividers each include a plurality of cavities that open to each of the flow channels and that have blind ends. The cavities each have an aspect ratio greater than one, and are configured to collect particles from the flow stream.

17 Claims, 6 Drawing Sheets

DRIVEN CAVITY PARTICLE SEPARATOR

TECHNICAL FIELD

The present invention generally relates to particle separation systems, and more particularly relates to a particle separator that uses driven cavities for collection of particles.

BACKGROUND

Particle separation from a fluid stream is desirable in a variety of systems. One such system involves the use of a gas turbine engine. A gas turbine engine may be employed to power various devices, mobile or stationary. For example, a gas turbine engine may be employed as a power source in an aircraft. Certain operating environments, such as dry or dusty operating environments, may cause the gas turbine engine to ingest fine sand and dust particles. These ingested fine sand and dust particles may pass through portions of the gas turbine engine eroding low temperature components, corroding high temperature components, and may accumulate in stagnation regions of cooling circuits within turbine components, such as turbine airfoils associated with the gas turbine engine. The ingestion of particles may affect operation efficiency and may reduce the lifespan of components such as the turbine airfoil or combustor, leading to increased repair costs and downtime for the gas turbine engine.

Accordingly, it is desirable to provide systems that provide effective removal of ingested particles. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, a particle separator includes a housing defining an inlet and an outlet. A flow stream is directed from the inlet to the outlet. A number of dividers are disposed in the housing and separate flow channels from each other. The flow channels extend from the inlet to the outlet. The dividers each have a profile so that the flow channels follow the profile. The dividers each include a plurality of cavities that open to each of the flow channels and that have blind ends. The cavities each have an aspect ratio greater than one, and are configured to collect particles from the flow stream.

In other embodiments, a particle separator includes a housing that has a pair of spaced apart plates through which a flow stream is directed. A number of dividers extend between the plates and separate flow channels from each other between the plates. The dividers each having a profile and the flow channels follow the profile. The dividers each define a plurality of cavities opening to each of the flow channels. The cavities each have a blind end, an aspect ratio greater than one, and are configured to collect particles from the flow stream.

In additional embodiments, a particle separator is disposed in a flow stream and includes a number of dividers aligned with one another and configured as guide vanes to separate the flow stream into multiple flow channels. The dividers each have a profile and the flow channels follow the profile. The dividers each define a plurality of cavities that open to each of the flow channels through an opening that has a diameter. The cavities each have a blind end, a depth from the opening to the blind end, and an aspect ratio greater than 1.0. The aspect ratio is a ratio of the depth to the diameter. The cavities are configured to collect particles from the flow stream.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
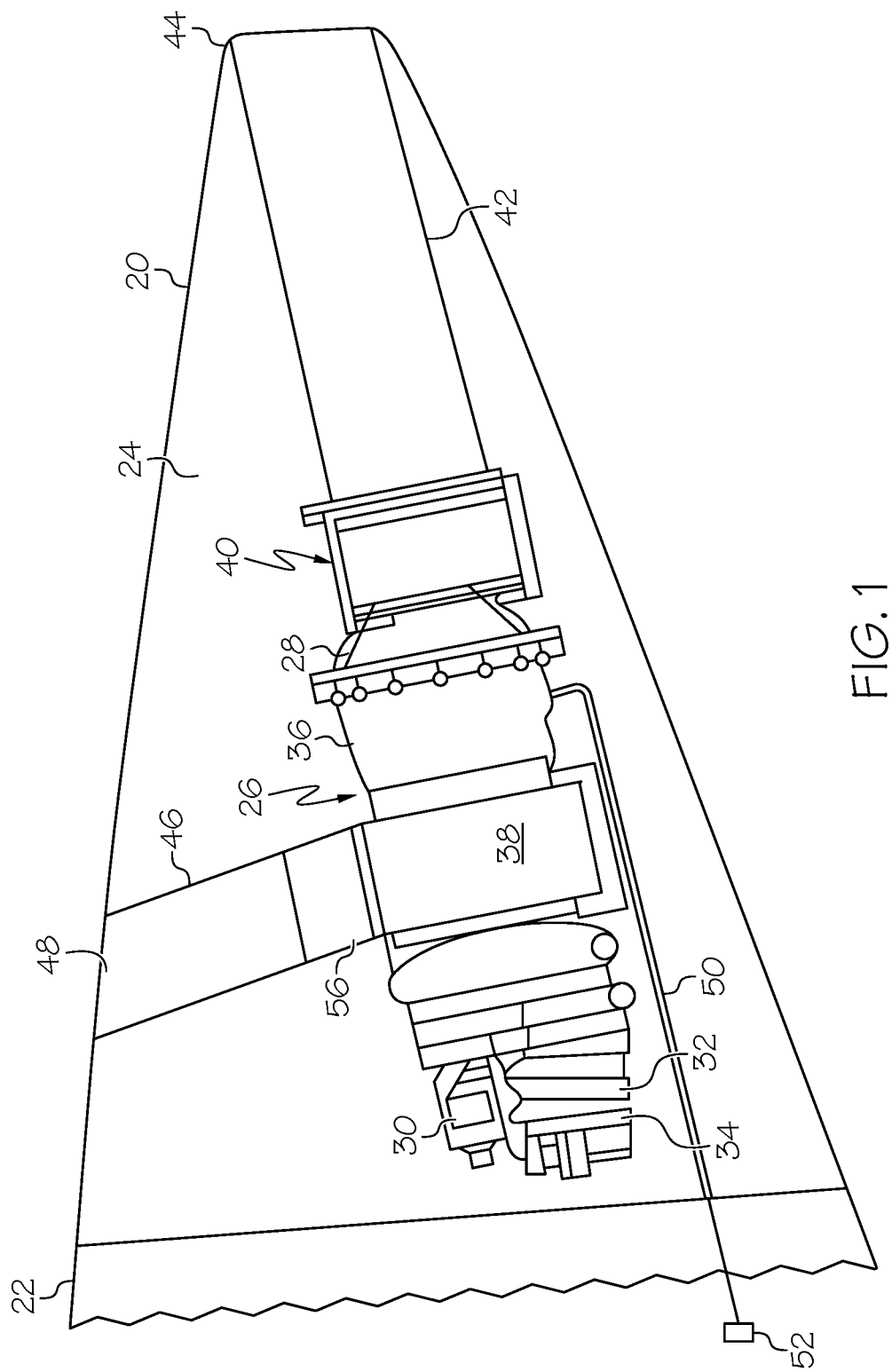
FIG. 1 is a cross-sectional illustration of a tail cone area of an aircraft including a gas turbine engine in an auxiliary power unit that includes a particle separator, according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, a driven cavity particle separator provides a mechanism of separating particles from a fluid stream. In an exemplary embodiment, a driven cavity particle separator separates a variety of particles, including small particles (0-20 micron), from an inlet air stream by bringing particle laden air in contact with dividers, where particles are trapped in thin cavities present on the dividers. As such, the dividers include a series of driven cavities formed as dead headed holes that trap and collect particles flowing by the dividers. The dividers are designed to use the inertia of entrained particles to create impingement. The particle separator is a passive device which is readily refreshed. Unlike a barrier filter which restricts air flow and creates an increasing pressure drop as the system loads, when the driven cavities are loaded with particles such as dust and sand, the pressure loss in the inlet system does not increase because the loading occurs sub-surface in the dividers, without obstructing the flow passages.

In the exemplary embodiments given herein, the driven cavity particle separator may be associated with an auxiliary power unit (APU) system, but the disclosure is not limited in application to such systems. An APU system typically operates when an aircraft is on the ground, such as when parked at a terminal gate, and so particle separation is particularly useful. However, the current disclosure is applicable to other applications including propulsion engines and other systems, where particle separation from a fluid stream is desirable.

In an exemplary embodiment of the present disclosure as further described below, a particle separator includes a housing defining an inlet and an outlet, and through which a flow stream is directed. A number of dividers, which may be configured in the form of guide vanes, are provided in the housing separating flow channels from each other between the particle separator's inlet and outlet. The dividers each have an undulating profile and the flow channels follow the undulating profile. The dividers each include a plurality of cavities that open to each of the flow channels and that have blind ends. The cavities each have an aspect ratio greater than one, and are configured to collect particles from the flow stream.

As noted above, the driven cavity particle separator system described herein may be employed in a variety of applications. By way of an exemplary embodiment presented for descriptive purposes, a gas turbine APU as illustrated in FIG. 1 is housed in the tail cone 20 area of an aircraft 22. The tail cone area 20 defines a compartment 24 that houses the APU 26. The APU 26 generally includes a turbine 28 which powers the APU 26, a starter 30 for starting the APU 26, a gearbox 32 for driving various loads including a generator 34 for supplying electrical power, a power compressor 38 for supplying air to the turbine 28, a combustor 36, an eductor system 40 for pumping air, and an exhaust duct 42 for delivering exhaust out of the tail 44 of aircraft 22. The compressor 38 receives outside air from an inlet duct 46 that extends between the APU 26 and an inlet opening 48. In the current embodiment, the opening 48 is presented through the side of the tail cone 20. The inlet opening may include a door that selectively opens when the APU 26 is in operation and is closed when the APU is not in use. In addition to supplying a main flow of combustion air to the turbine 28, the compressor 38 delivers, via a bleed system, compressed air for pneumatic powered systems 52 of the aircraft 22 through a supply duct 50. Accordingly, gas in the form of air is compressed by the compressor 38 and delivered for separate uses including by the combustor 36 and by the systems 52. The air supplied to the systems 52 is referred to as bleed air, which is separated from the main flow going to the combustor 36 internally in the compressor 38. Removing particles from the air used in the APU 26 is desirable to maintain efficient operation and to reduce wear on components.

Accordingly, in the current embodiment, the inlet duct 46 includes a driven cavity particle separator unit 56, disposed to collect particles from the incoming air stream prior to reaching the compressor 38. The particles targeted for collection are generally sized in the range of 0-20 microns, although larger particles may also be captured. The compressor 38 operates most efficiently when the inlet pressure is as high as possible. Accordingly, a barrier filter or other mechanism that creates a significant pressure drop in the inlet duct 46, or that diverts air prior to reaching the compressor, is not used. Instead, the driven cavity particle separator 56 is employed to remove particles.

Figure 2:
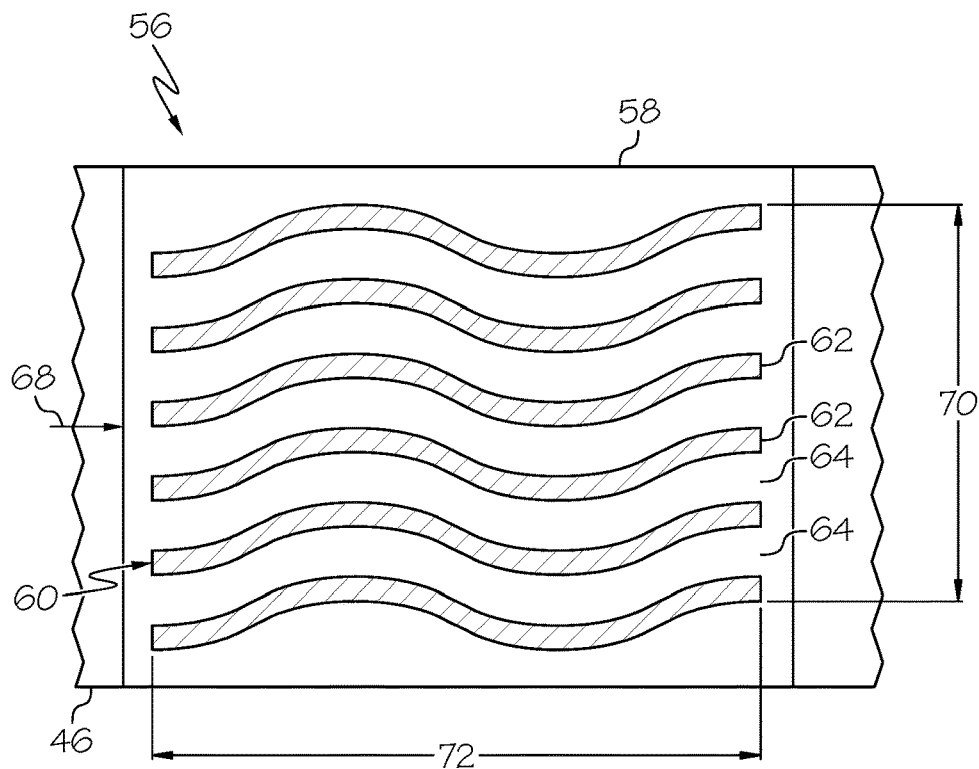
FIG. 2 is a schematic, cross sectional illustration of the particle separator area of the auxiliary power unit of FIG. 1.
Figure 3:
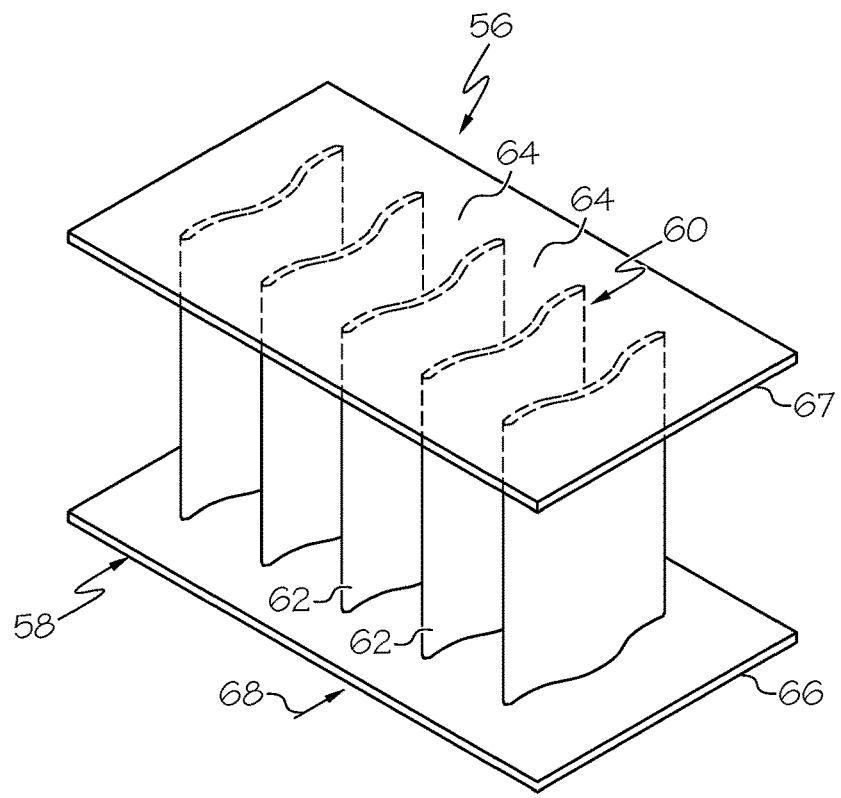
FIG. 3 is a schematic perspective illustration of the particle separator of FIG. 2.

With additional reference to FIGS. 2 and 3, the driven cavity particle separator unit 56 includes a housing 58 sized to fit across the entire inlet duct 46 without a reduction in flow area size. The driven cavity particle separator unit 56 is configured to collect particles passively as described in more detail herein, and has no need to divert any of the air flow out of the inlet duct 46. Instead, all incoming air flow is directed to the compressor 38. The driven cavity particle separator unit 56 is configured to be readily refreshed by being removed for cleaning or replacement. For example, it may be removed, cleaned and replaced, or may be periodically swapped out during other scheduled maintenance for off-line cleaning or disposal, without increasing down time. The driven cavity particle separator unit 56 may be held in place in the inlet duct 46 by conventional fasteners (not shown), may be configured to slide in and out of the inlet duct 46, and/or may be contained by other means.

The driven cavity particle separator unit 56 includes a series of elements for dividing flow that are referred to collectively and generally as dividers 60, and in the current example are configured specifically as individual guide vanes 62. The guide vanes 62 are aligned with one another dividing the interior of the driven cavity particle separator unit 56 to define a series of flow channels 64 generally disposed in the direction of the air flow stream 68 through the inlet duct 46 and the driven cavity particle separator unit 56. The guide vanes 62 are generally in the form of plates that collectively have a width 70 normal to the direction of the air flow stream 68 sized to extend substantially completely across the driven cavity particle separator unit 56, and a length 72 along the direction of the air flow stream 68 selected to provide a desired particle removal efficiency without creating a significant pressure drop. In the current embodiment, the air flow stream 68 has a velocity of about 36 meters per second. In the current example, the width 70 is 12.7 inches and the length 72 is 10 inches. Accordingly, the length 72 is smaller than the width 70 and has been found to create a negligible pressure drop across the driven cavity particle separator unit 56. The number of guide vanes 62 is determined by their thickness and the size of the inlet duct 46 as further detailed below. As shown in FIG. 3, the assembly includes the guide vanes 62, each of which is connected to end plates 66, 67 forming a convenient assembly that is configured to slide into the inlet duct 46 such as through an access panel (not shown).

Figure 4:
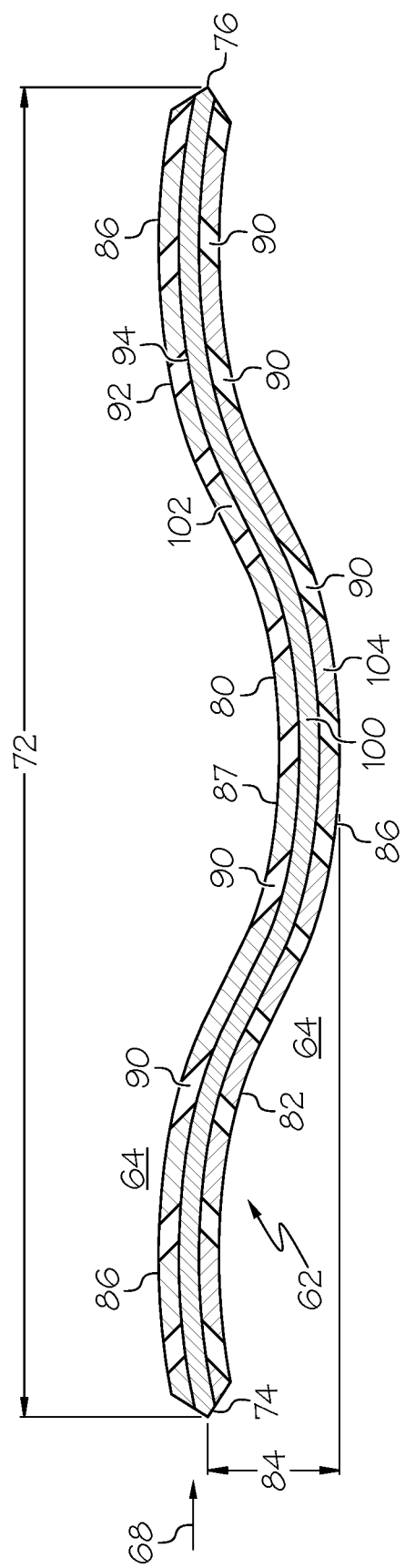
FIG. 4 is a detail, cross-sectional illustration of one guide vane of the particle separator of FIG. 2.
Figure 7:
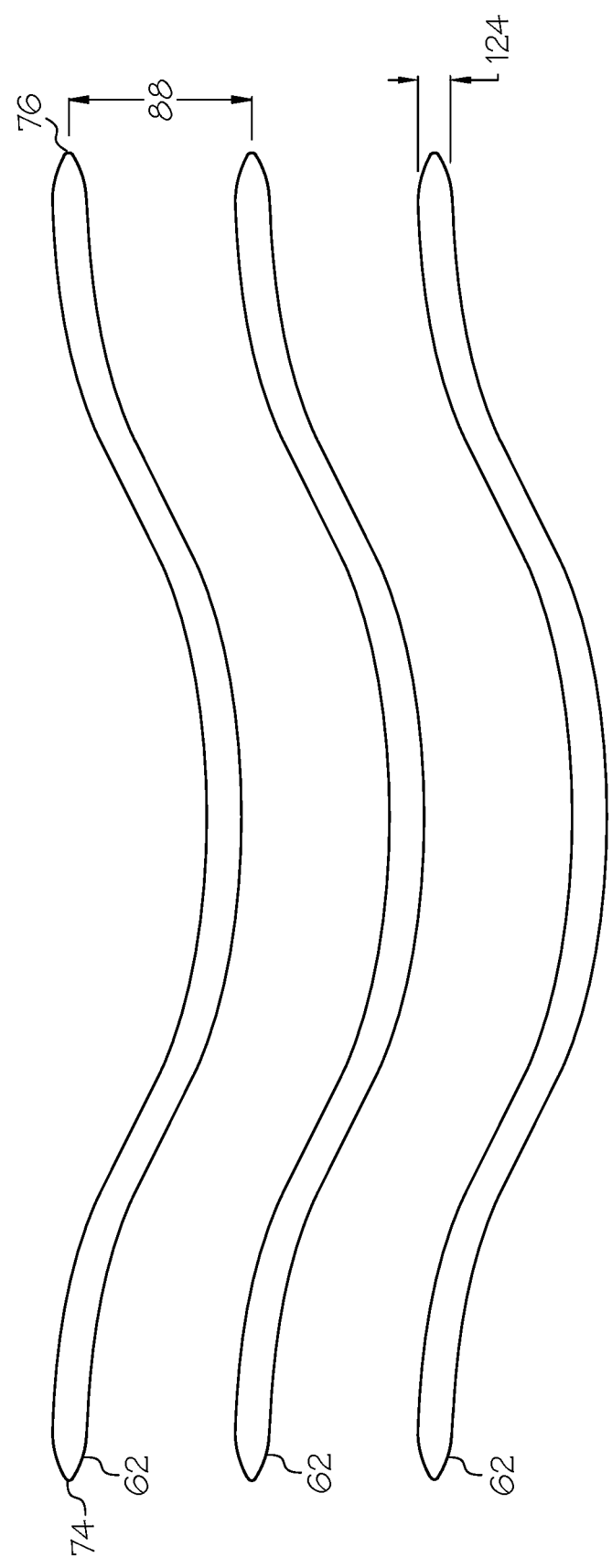
FIG. 7 is a schematic illustration of a guide vane area, according to an exemplary embodiment.

Referring to FIG. 4, an individual guide vane 62 is illustrated. The guide vane 62 extends along its length 72 from an inlet end 74 to an outlet end 76. In the current embodiment, the guide vane 62 is formed in an undulating, sinusoidal-like shape. It will be appreciated that the number of undulations may vary, and FIG. 4 is but one example of the possible configurations. In other embodiments, the guide vane may have a different number of undulations or may take other shapes, the intent being to sufficiently redirect the air flow through the flow channels 64 to increase interaction of the guide vane 62 with the incoming dust laden air, and therefore to increase the occurrence of impingements and near impingements between the surfaces 80, 82 and dust particles. As the air flow stream 68 follows the surfaces 80, 82, particle capture is maximized due to inertia of the particles through the curving paths and their tendency to travel toward the guide vane 62 as the air stream turns. It should be noted that the guide vane 62 has a smoothly transitioning shape between undulations to minimize pressure drop which might otherwise be increased by sharp transitions such as those that would result from corners or conspicuous angles. The curved surfaces of the undulations create localized acceleration zones as the air flow stream 68 follows the surfaces 80, 82, in particular as the air rounds the outside of the peaks 86. As the air flows across the valley 87, its velocity slows, increasing the movement of particles toward the guide vane 62. In this embodiment, the distance of the offset 84 between the inlet end 74 and the peak 86 on an undulation is greater than the spacing (vane pitch 88 as shown in FIG. 7), between adjacent guide vanes 62 so that air cannot pass straight through the driven cavity particle separator unit 56 without being turned by the guide vanes 62.

Figure 5:
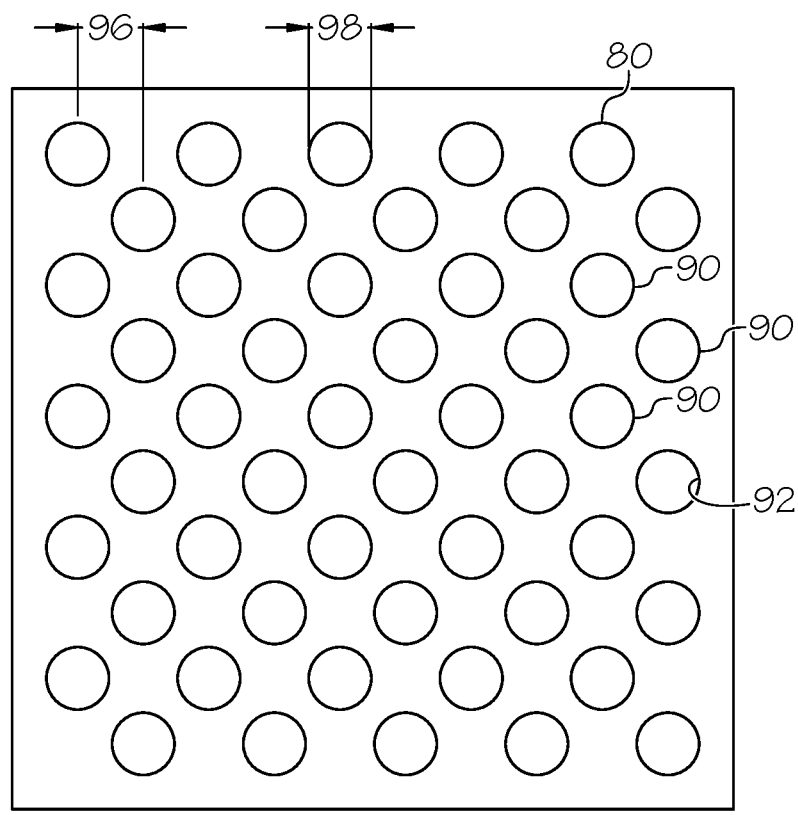
FIG. 5 is a fragmentary illustration of the driven cavity layout of the guide vane of FIG. 4.

The guide vane 62 includes a number of cavities 90 distributed throughout the entire surfaces 80, 82 so as to be open to the adjacent flow channels 64. The cavities 90 are formed part way through the guide vane 62 and are inclined toward the incoming air flow stream 68 so that their openings 92 are located upstream from their blind ends 94. As shown in FIG. 5, the cavities 90 are distributed in the surface 80 (distribution in surface 82 being similar), in a staggered pattern with a row spacing 96 of 1-3 times the width (as seen by the incoming air flow stream 68), of the cavities 90. A spacing a 1.0 times the width 98 ensures complete coverage of cavities 90 across the air flow stream 68, while a greater spacing provides a stronger guide vane 62, with up to 3 times providing a desirable high incidence of interaction between incoming particles and the cavities 90. The cavities 90 are generally evenly distributed over the entirety of the surfaces 80, 82. In the current embodiment, the cavities 90 are cylindrical with circular openings 92, however, other shapes are contemplated by the current disclosure including and polygon or complex shape. In addition, other cavity layout patterns are contemplated, the intent being to distribute the cavities 90 on the surfaces 80, 82 to maximize interaction with the air flow stream 68.

As illustrated in FIG. 4, the guide vanes 62 of the current embodiment are constructed of three discrete plates mating together for simplicity of cavity 90 formation. The guide vane 62 includes a base plate 100 that is solid and two outer plates 102, 104 that are formed as perforated sheets, with the perforations forming the cavities 90. The base plate 100 is joined with the outer plates 102, 104 by conventional means to form the guide vane 62. The undulations may be formed either before or after the plates 100, 102, 104 are joined. By forming the cavities 90 in the outer plates 102, 104 they may be readily created by operations such as piercing, stamping, or otherwise, and numerous shapes of the cavities 90 may be made based on the shape of the forming tool. In other embodiments, the guide vane 62 may be made from a single sheet of material with the cavities 90 formed by molding, boring or other manufacturing processes. Use of a one-layer material may be desirable where the depth of the cavities 90 is greater than half of the thickness of the guide vane 62. Because the driven cavity particle separator unit 56 of the current embodiment operates under exposure to ambient air, it may be constructed from a wide variety of materials including metals, polymers, composites, and others.

Figure 6:
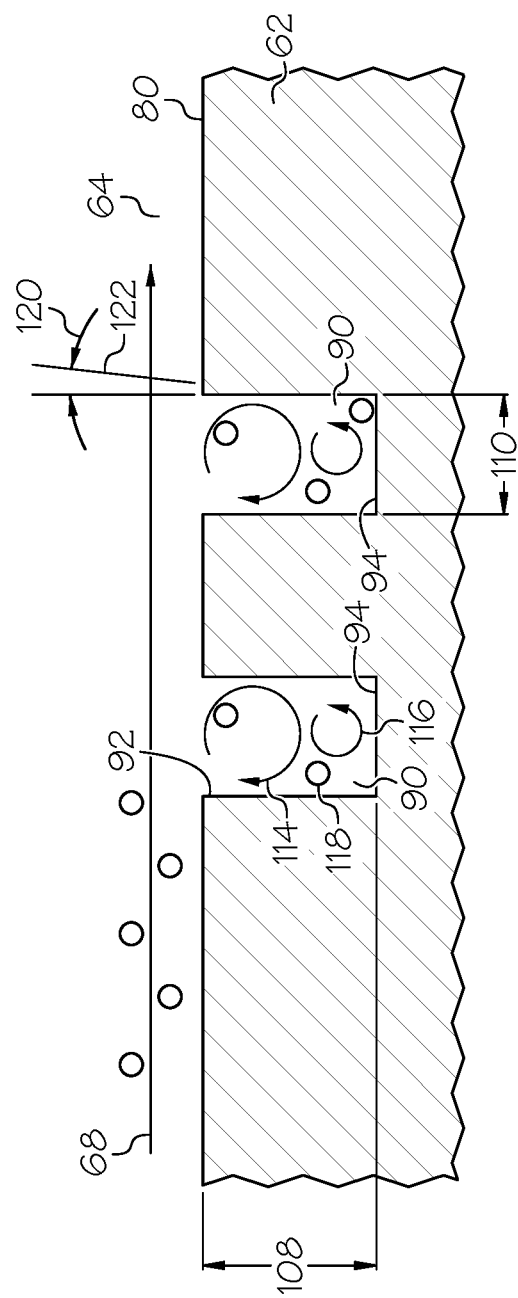
FIG. 6 is a fragmentary, cross-sectional illustration of part of driven cavities of the guide vane of FIG. 4.

Referring to FIG. 6, a pair of cavities 90 are illustrated in cross section. Each cavity 90 is formed through its respective surface, in this case the surface 80, with an opening 92 that connects the cavity 90 to the air flow stream 68, and a blind end 94 within the guide vane 62. Each cavity 90 has a depth 108, so that the depth 108 to opening length 110 ratio (aspect ratio), is greater than 1.0 (and up to about 3.0), with higher aspect ratios being preferred at smaller opening sizes. The opening length 110 is equal to the distance across the opening 92 as seen by the air flow stream 68. In the case of a cylindrical cavity 90 with a round opening 92, the length 110 is equal to the diameter of the opening 92. With an aspect ratio greater than 1.0, multiple vortices are created in the cavity 90. This results in a primary vortex 114 that draws a particle into a cavity 90, and one or more secondary vortices 116 that are not directly in communication with the air flow stream 68 to separate particles, such as a particle 118, for deposit in the cavity 90. The incline angle 120 of the cavities 90 relative to a line 122 normal to the local surface 80 is in the range of 0-70 degrees to assist in capturing particles and may vary across a range of angles in a given guide vane 62.

As illustrated in FIG. 7, vane thickness 124 is the thickness of a guide vane 62 at points away from the narrowed ends 74, 76, and vane pitch 88 is the distance between the centers of adjacent guide vanes 62. The vane thickness 124 is selected to minimize pressure drop trough the driven cavity particle separator unit 56 and in this embodiment, is consistent along the length of the guide vane 62, except at the ends 74, 76. For example, the vane thickness 124 may be 0.25 inch. Accordingly, the depth of the cavities 90 is limited to less than the distance through the guide vane 62 (0.25 inch), to maintain a blind end 94. In this example, the diameter of the cavities 90 will be less than about 0.25 inch to maintain an aspect ratio greater than 1.0. As a result, the row spacing 96 (shown in FIG. 5), will be in the range of about 0.25-0.75 inch. In the case of a multi-layer guide vane 62 constructed per FIG. 4, the dimensions will be adjusted downward to account for the thinner outer plates 102, 104 which contain the cavities 90. The thickness 124 of the guide vanes 62 and the total number of cavities 90 may be tailored to maintain a negligible pressure drop through the driven cavity particle separator unit 56 of less than one percent. In certain embodiments, the cavities 90 have a diameter of 1-2 millimeters and a depth of 1.5-3 millimeters, for an aspect ratio greater than 1.0 (up to 3.0), when the diameter is 1 millimeter and the depth is 3 millimeters, for example. The total number of guide vanes 62 and the total number of cavities 90 may be balanced with resulting the pressure drop to achieve a desired particle capture rate with an acceptable pressure drop. As the driven cavities 90 become loaded with particles, the system does not experience an increase in pressure drop because the particles are captured below the surfaces 80, 82.

Through the examples described herein, an efficient manner of removing particles from a gas flow stream is provided without passing inlet air through a barrier filter, and without a need to divert air flow from its intended purpose. The air flow stream passes through a particle separator and passes by a series of dividers with driven cavities so that particles are deposited in the cavities. The particle collector is entirely passive and may be readily refreshed through cleaning or replacement. The driven cavity particle separator has applicability wherever particle separation from a fluid stream is desired. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A particle separator comprising:
   a housing defining an inlet and an outlet, and through which a flow stream is directed; and
   a number of dividers in the housing separating flow channels from each other, the flow channels extending from the inlet to the outlet, the dividers each having a profile wherein the flow channels follow the profile, the dividers each including a plurality of cavities of a cylindrical shape with openings that are circular, each divider having a thickness defining a distance through the divider, the cavities each having a depth limited to less than the distance through the respective divider to maintain a blind end in each cavity, the depth extending from the opening of the respective cavity to the blind end of the respective cavity, each cavity having a length across its respective opening in a direction of the flow stream, the cavities each having an aspect ratio greater than one where the depth of the respective cavity is greater than the length of the respective cavity, and each cavity configured due to its respective blind end and aspect ratio to generate vortices in the cavity that collect particles from the flow stream and to deposit the particles in the cavities at the blind ends.

2. The particle separator of claim 1, wherein each divider comprises a core plate that is solid and a pair of outer plates each of which includes the cavities, wherein the cavities are defined entirely in the pair of outer plates.

3. The particle separator of claim 1, wherein the flow stream travels in an upstream to downstream direction, and wherein each cavity is inclined at an angle so that its respective opening is located upstream relative to its respective blind end.

4. The particle separator of claim 1, wherein, other than the cavities extending into the dividers, the dividers each have an inlet end that includes a first taper to a first point and an outlet end that includes a second taper to a second point, wherein each divider has a consistent, unvarying thickness between the first and second tapers.

5. The particle separator of claim 1, wherein the dividers each have two surfaces facing the flow stream and wherein the cavities are distributed in both surfaces.

6. The particle separator of claim 5, wherein the cavities have a width and are aligned in rows, and each row is aligned with the flow stream, wherein a row is spaced from its adjacent rows a distance equal to 1.0-3.0 times the width.

7. The particle separator of claim 1, wherein the profile is undulating in a sinusoidal-like shape with smoothly transitioning curves.

8. The particle separator of claim 7, wherein the dividers are separated by a pitch and each divider has an inlet end and an outlet end, and wherein the profile has at least one peak that is offset from the inlet end by a distance greater than the pitch between adjacent dividers.

9. The particle separator of claim 1, wherein the housing includes first and second plates, wherein each divider is connected with both plates.

10. A particle separator comprising:
    a housing having a first plate and a second plate spaced apart from the first plate, and through which a flow stream is directed; and
    a number of dividers extending between the first and second plates and separating flow channels from each other between the plates, the dividers each having a profile wherein the flow channels follow the profile, the dividers each defining a plurality of cavities opening to each of the flow channels, each divider having a thickness defining a distance through the divider, each divider having perforated sheets with the perforations forming the cavities, the cavities each having a depth limited to less than the distance through the respective divider to maintain a blind end in each cavity, the depth extending from an opening of the respective cavity to the blind end of the respective cavity, each cavity having a length across its respective opening in a direction of the flow stream, the cavities each having an aspect ratio greater than one where the depth of the respective cavity is greater than the length of the respective cavity, and each cavity configured due to its respective blind end and aspect ratio to generate vortices in the cavity that collect particles from the flow stream and to deposit and collect the particles in the cavities at the blind ends.

11. The particle separator of claim 10, wherein the flow stream travels in an upstream to downstream direction and each cavity is inclined at an angle so that its respective opening is located upstream relative to its respective blind end.

12. The particle separator of claim 10, wherein the dividers each have two surfaces facing the flow stream, and wherein the cavities are distributed in both surfaces.

13. The particle separator of claim 12, wherein the cavities have a width and are aligned in rows and each row is aligned with the flow stream, wherein a row is spaced from its adjacent rows a distance equal to 1.0-3.0 times the width.

14. The particle separator of claim 10, wherein the profile is undulating in a sinusoidal-like shape with smoothly transitioning curves and with no corners.

15. The particle separator of claim 14, wherein the dividers are separated by a spacing pitch and each divider has an inlet end and an outlet end, and wherein the profile has at least one peak that is offset from the inlet end by a distance greater than the spacing pitch between adjacent dividers.

16. The particle separator of claim 10, wherein the housing includes first and second plates, wherein each divider is connected with both plates.

17. A particle separator disposed in a flow stream and comprising a number of dividers aligned with one another and configured as guide vanes to separate the flow stream into multiple flow channels, the dividers each having a profile wherein the flow channels follow the profile, the dividers each defining a plurality of cavities of a cylindrical shape with openings that are circular, each divider having a thickness defining a distance through the divider, the cavities each having a depth limited to less than the distance through the respective divider to maintain a blind end in each cavity, the depth extending from the opening of the respective cavity to the blind end of the respective cavity, each cavity having a length across its respective opening in a direction of the flow stream, the cavities each having an aspect ratio greater than one where the depth of the respective cavity is greater than the length of the respective cavity, and each cavity configured due to its respective blind end and aspect ratio to generate vortices in the cavity that collect particles from the flow stream, and to deposit the particles in the cavities at the blind ends.

* * * * *